(12) United States Patent
Fu et al.

(10) Patent No.: US 8,683,196 B2
(45) Date of Patent: *Mar. 25, 2014

(54) TOKEN RENEWAL

(75) Inventors: Christina Fu, Saratoga, CA (US); John Garraye Magne, Foster City, CA (US)

(73) Assignee: Red Hat, Inc., Raleigh, NC (US)

( * ) Notice: Subject to any disclaimer, the term of this patent is extended or adjusted under 35 U.S.C. 154(b) by 610 days.

This patent is subject to a terminal disclaimer.

(21) Appl. No.: 12/625,464

(22) Filed: Nov. 24, 2009

(65) Prior Publication Data

US 2011/0126002 A1 May 26, 2011

(51) Int. Cl.
*G06F 21/00* (2013.01)

(52) U.S. Cl.
USPC .............. 713/156; 705/44; 705/76; 726/5; 726/6; 726/9; 726/27; 709/224; 713/185

(58) Field of Classification Search
USPC ........................................... 713/156
See application file for complete search history.

(56) References Cited

U.S. PATENT DOCUMENTS

| | | | |
|---|---|---|---|
| 6,233,341 B1* | 5/2001 | Riggins | 380/277 |
| 6,510,513 B1* | 1/2003 | Danieli | 713/156 |
| 6,647,494 B1* | 11/2003 | Drews | 713/170 |
| 6,738,907 B1* | 5/2004 | Carter | 726/9 |
| 6,760,843 B1* | 7/2004 | Carter | 726/10 |
| 7,047,409 B1* | 5/2006 | Aull et al. | 713/173 |
| 7,788,703 B2* | 8/2010 | Jou et al. | 726/2 |
| 8,010,805 B2* | 8/2011 | Gervais et al. | 713/193 |
| 2001/0032310 A1* | 10/2001 | Corella | 713/156 |
| 2003/0105955 A1* | 6/2003 | Carroll et al. | 713/156 |
| 2004/0199469 A1* | 10/2004 | Barillova et al. | 705/44 |
| 2005/0144463 A1* | 6/2005 | Rossebo et al. | 713/185 |
| 2008/0246587 A1* | 10/2008 | Fisher | 340/5.73 |
| 2010/0135492 A1* | 6/2010 | Jia | 380/247 |
| 2011/0113248 A1* | 5/2011 | Kocher | 713/168 |

OTHER PUBLICATIONS

Public Key Infrastructure (PKI) Public Key-Enabled Application Requirements |http://bluecoat-02/cfru=aHR0cDovL2ppdGMu Zmh1LmRpc2EubWIsL3BraS9kb2N1bWVudHMvZG9kX3BraV9 wdWJsaWNfa2V5X2VuYWJsZWRfY XBwbGljYXRpb25fcm VxdWlyZW1lbnRzX3YxXzA3X2p1bHlfMTNfMjAwMC5kb2M= |Version 1.0|DOD|Jul. 2000.*
Self-Organized Network—Layer Security in Mobile Ad Hoc Networks|http://citeseerx.ist.psu.edu/viewdoc/download?doi=10.1. 1.119.884&rep=rep1&type=pdf|Yang et al.|pp. 261-273|Feb. 2006.*
Red Hat Certificate System 8.0—Admin Guide, Publication date Jul. 22, 2009, 86 pages, published at http://www.redhat.com/docs/manuals/cert-system/8.0/admin/Admin_Guide.pdf.

\* cited by examiner

*Primary Examiner* — Mahfuzur Rahman
(74) *Attorney, Agent, or Firm* — Lowenstein Sandler LLP

(57) ABSTRACT

A method and system for renewing certificates stored on tokens is described.

22 Claims, 5 Drawing Sheets

TOKEN RENEWAL

TECHNICAL FIELD

Embodiments of the invention relate to the field of token management, and more particularly, to renewal of digital certificates stored on tokens.

BACKGROUND

Network users frequently have to submit multiple passwords for the various services they use, such as email, web browsing and intranets, and servers on the network. Maintaining multiple passwords, and constantly being prompted to enter these passwords, is a hassle for users and administrators. Single sign-on is a configuration which allows administrators to create a single password store so that users can log in once, using a single password, and be authenticated against all network resources. For example, a system supporting single sign-on may be used for several resources, including logging into workstation and unlocking screen savers, accessing encrypted web pages using Mozilla Firefox, and sending encrypted email using Mozilla Thunderbird. Single sign-on is both a convenience to users and another layer of security for the server and the network. Single sign-on hinges on secure and effective authentication. The authentication may be managed by a public key infrastructure (PKI), such as implemented by a certificate system.

One of the cornerstones of establishing a secure network environment is making sure that access is restricted to people who have the right to access the network. This access is allowed when the user can authenticate to the system, meaning the user can verify his identity. One method of verifying an identity is presenting a digital signature or a digital certificate. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. A digital certificate, commonly referred to as a certificate, is an electronic document used to identify an individual, a server, a company, or another type of entity and to associate that identity with a public key. The digital certificate binds a person's identity to his or her public key, and consequently, to his or her private key, and may be used to verify digital signatures. Digital certificates and digital signatures then provide the foundation for secure transactions over a network, such as the Internet.

These certificates can be stored on tokens, also referred to as smart cards, smart card tokens, security tokens, hardware tokens, USB tokens, cryptographic tokens, key fobs, or the like. The token may be a physical device that an authorized user of computer services is given to ease authentication. Tokens can store a certificate that is used for authenticating the identity of the owner. For example, when a user inserts a smart card into a system, the smart card presents the certificates to the system and identifies the user so the user can be authenticated over the network.

Certificate authorities (CAs) validate identities and issue certificates. CAs can be either independent third parties or organizations running their own certificate-issuing server software, such as a certificate system. Before issuing a certificate, a CA must confirm the user's identity with its standard verification procedures. The certificate issued by the CA binds a particular public key to the name of the entity identified by the certificate. In addition to the public key, the certificates include the name of the entity it identifies, an expiration date, and the name of the CA that issued the certificate. Since certificates have an expiration date, such as, for example, 2-3 years, certificates need to be renewed to avoid expiration. Thus, certificates stored on tokens need to be renewed.

Conventional certificate systems require re-enrollment of tokens to renew the certificates stored on the token. The re-enrollment of the token would allow a formatted token to be re-formatted with new certificates. The re-enrollment of the token, however, requires the generation of a new key pair for the new certificates.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
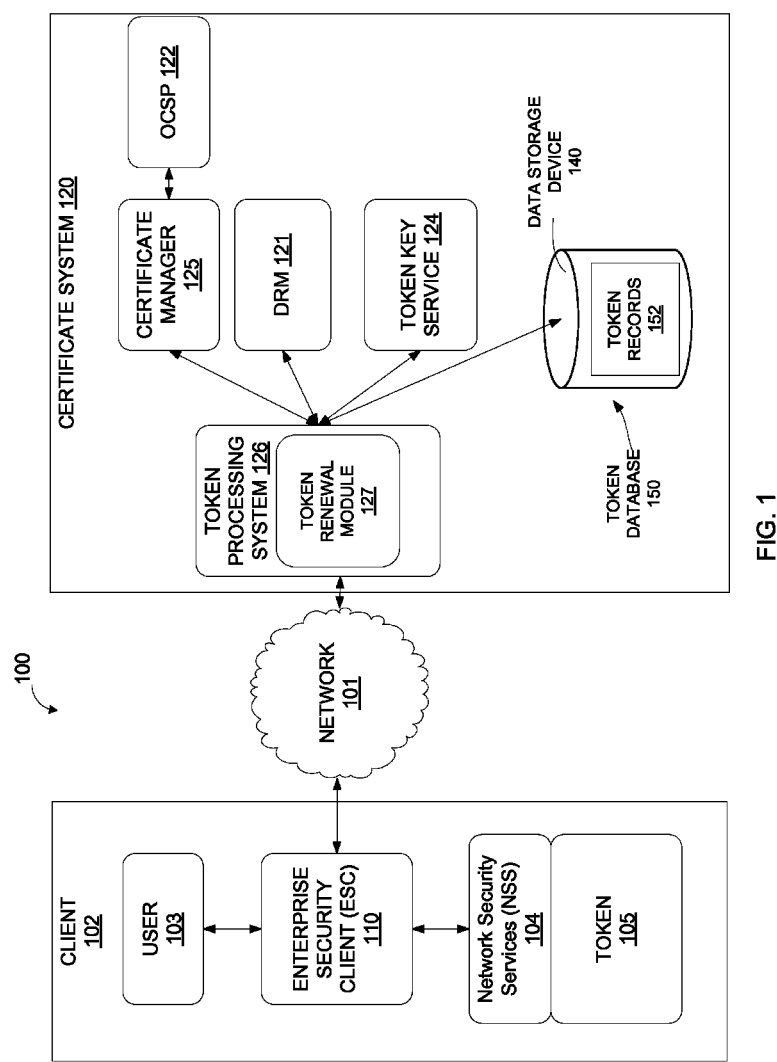
FIG. 1 is a block diagram of exemplary system architecture in which embodiments of a token processing system (TPS), having a token renewal module, may operate.

A method and system for token renewal is described. In one embodiment, a method, implemented by a computing system programmed to perform operations, includes receiving a token renewal request for renewing an original digital certificate stored on a token, and renewing the original certificate stored on the token as a renewed certificate when the token renewal request is approved. The renewed certificate includes the same key as the original certificate, but includes a new expiration date. The renewed certificate is functionally identical to the original certificate stored on the token.

Embodiments of the present invention provide an improved approach to renewing certificates stored on tokens. By allowing the renewed certificate to reuse the same key as the original certificate, the renewal process is faster than conventional systems because a new key pair does not need to be generated for the renewed certificate. Also, since the original key pair is retained on the token, the renewal process is simplified because the tokens do not need to be reformatted with new certificates, and thus, no new keys are generated for renewal.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "renewing," "approving," "authenticating," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a TPS 126, having a token renewal module 127, may operate. The architecture 100 includes a client 102 and a certificate system 120, each coupled to the network 101 that communicates any of the standard protocols for the exchange of information. The network 101 may be a Local Area Network (LAN) and may be incorporated into the same physical or logical system, or different physical or logical systems. Alternatively, the client 102 and certificate system 120 may reside on different LANs that may be coupled together via the Internet (e.g., network 101), but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120 and the client 102.

The client 102 may be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. The client 102 includes a client application, such as the depicted enterprise security client (ESC) 110 that communicates with the token 105 and the token processing system (TPS) 126 over the network 101. The ESC 110 is a user interface used by a user 103 of the client 102 and the token 105 (e.g., smart card) to communicate with the certificate system 120. The ESC 110 may be used in connection with the certificate system 120 to manage tokens, such as, formatting the tokens, issuing certificates for the tokens, renewing certificates for the tokens, and other management operations associated with the tokens stored on the token 105. End users can use smart card tokens to store user certificates, and can use the smart card tokens for applications such as single sign-on access and client authentication. The certificate system 120 issues certificates and keys required for signing, encryption, and/or other cryptographic functions to be stored on end user's tokens.

The certificate system 120 may be one or more machines including one or more server computers, gateways or other computing systems. In one embodiment, the certificate system 120 resides on multiple servers, including a certificate authority (CA) server that hosts the certificate manager 125, and another server that hosts the TPS 126. Certificate authorities (CAs) validate identities and issue certificates. CAs can be either independent third parties or organizations running their own certificate-issuing server software, such as a certificate system. It should be noted that various other network configurations can be used including, for example, hosted configuration, distributed configurations, centralized configurations, etc. The certificate manager 125 may operate as a CA that can issue, renew, revoke, and publish a wide variety of certificates, for servers, for users, for routers, for other subsystems, and for file or object signing. The certificate manager 125 can be implemented as software, hardware, firmware or any combination of the above. The certificate manager 125 is the core of a CA's PKI. The PKI is a set of hardware, software, people, policies, and procedures needed to create, manage, distribute, use, renew, and revoke digital certificates. The certificate manager 125 can also compile and publish certificate revocation lists (CRLs). The certificate manager 125, which is sometimes referred to as the CA server, can establish and maintain relationships with the TSP 126 to receive certificate renewal requests for certificates stored on the token 105. In one embodiment, the certificate manager 125 issues a certificate (e.g., SSL client certificate) to the TPS 126, allowing the TPS 126 to be a trusted subsystem of the certificate manager 125. Since the TPS 126 is a trusted subsystem of the certificate manager 125, the requests received from the TPS 126 do not need to be authenticated by the certificate manager 125.

In the depicted embodiment, the certificate system 120 implements a token management system using three main components—the ESC 110, the TPS 126, and the token key service (TKS) 124. The TPS 126 and the TKS 124 are used to process token-related operations, and the ESC 110 is the interface that allows the token 105 and the user 103 to access these components of the token management system. The TKS 124 derives keys based on the token identifier information and/or private information, and a defined algorithm. These derived keys are used between the token and the TKS 124 to provide a secure channel that allows operations, such as to format tokens and enroll tokens to be processed securely. The TPS 126 interacts directly with external tokens, like the tokens 105, and manages the keys and certificates on those tokens through the ESC 110. The ESC contacts the TPS 126 when there is a token operation, and the TPS 126 interacts with the certificate manager 125, a data recovery manager (DRM), or TKS 124, as required, then sends the information back to the token via the ESC 110. For example, after a token is enrolled, applications such as Mozilla Firefox and Thunderbird can be configured to recognize the token and use it for security operations, like client authentication and Secure/Multipurpose Internet Mail Extensions (S/MIME) mail. S/MIME is a standard for public key encryption and signing of e-mail encapsulated in MIME. In one embodiment, the TPS 126 communicates with an applet on a smart card. The smart cards can be manufactured with both a card manager applet and a vendor applet or with only the card manager applet. If the cards only have the card manager applet, the TPS 126 can install the certificate system's applet onto the smart card.

In one embodiment, the ESC 110 provides the following capabilities: 1) supports Global Platform-compliant smart cards, like Gemalto 64K V2 and Safenet 300J Java smart cards; 2) points the smart card tokens to the appropriate TPS for enrollment and renewal, 3) maintains the smart card token, such as re-enrolling a token with TPS 126; 4) provides information about the current status of the token or tokens being managed; and 5) renews the certificate(s) stored on the token.

In the depicted embodiment, the ESC 110 communicates with the token 105 via a Network Security Services (NSS) 104. The NSS comprises a set of libraries designed to support cross-platform development of security-enabled client and server applications. Applications built with NSS can support SSLv2, SSLv3, TLS, S/MIME, and other security standards. In one embodiment, the ESC 110 communicates with the TPS 126 using HTTP or HTTPS. Alternatively, the ESC 110 communicates with the TPS 126 using other protocols as would be appreciated by one of ordinary skill in the art having the benefit of this disclosure.

In addition to the token management system and the certificate manager 125, the certificate system 120 may also include other subsystems, such as a key recovery authority called a DRM 121, an online certificate status responder (OSCP 122), and a token database 123. The DRM 121 stores key pairs, so that in case a token is lost or broken, the keys can be recovered and the certificates can be retrieved and restored on the token. The TPS 126 and DRM 121 subsystems can support server-side key generation so that keys can be archived and recovered on a separate token if a token is lost. The OCSP 122 verifies whether a certificate is valid and not revoked. This function can also be done by the certificate manager 125 having an internal OCSP service, but using an external OCSP eases the load on the certificate manager 125.

In the depicted embodiment, the TPS 126 manages a token database 150 on a data storage device 140. In one embodiment, the token database 150 is backed by a directory server. In one embodiment, the token database 150 stores token records 152. The token records 152 may include token data associated with each registered token. Each of the token records 152 associates the respective token with one or more certificates and a user. In other embodiments, the token records 152 may also contain other information, such as, for example, enrollment information, the certificate's public key, subject DN, the certificate's extension, status information of the token, the validity period of the certificate, and/or the grace period for renewing the certificate, which is the time before and after the expiration date when renewal is allowed. The token records 152 may also store a token policy that specifies whether the token can be renewed. The token policy may be a set of rules that define what the user can do after the token is enrolled, such as whether the user can reset the password, reuse the token, renew the token, re-enroll the token, or the like. In one embodiment, in the token database 150, each token record 152 contains many fields, one of which is for the token policy (e.g., "tokenPolicy" field). The token policy may be set to allow re-enrollment of the token (e.g., RE_ENROLL=YES), which allows the token to be re-enrolled when a token with active certificate(s) is used to enroll. As described herein, during re-enrollment a new certificate having a new key pair is generated for the token. For example, when a token is inserted, if the token is uninitialized, then the renewal token policy is ignored, and the full enrollment of the token takes place. However, if the token is initialized and has an active token status, and the token policy is set to re-enrollment, the token will be re-enrolled. In another embodiment, the token policy is set to allow renewal of the token (e.g., RENEW=YES). For the above example, if the token policy is set to renew, instead of re-enroll, the token will be renewed, instead of re-enrolled. When the token is renewed, the keys are reused. In one embodiment, the keys are retained on the token, and the certificates are renewed with the same keys and re-issued by the CA. By renewing the token, the renewal operation will be faster than the actual enrollments because there will be no key generation involved. The token policies may also specify other conditions for renewal of certificates stored on the token, such as a policy that allows renewals for designated types of certificates, a policy that specifies whether all certificates, or at least one of the certificates, stored on the token needs to be renewed, or the like. In one embodiment, the token policies for the token records 152 may be set via an interface provided to an agent of the TPS, such as via web-based TPS services page that allows user input pertaining to the token policies for a specific token, for a group of tokens, or the like.

In one embodiment, the data storage device 140 is a Lightweight Directory Access Protocol (LDAP) repository having LDAP entries that store the token records 152. The TPS 126 organizes information stored in the LDAP repository in a hierarchical manner using directories. These directories can store a variety of information and can enable access to the information from any machine on the LDAP-enabled network. In other embodiments, the certificate system 120 can implement the token database 150 using various types of database technologies other than LDAP. Also, the token records 152 may be managed using technologies other than databases.

The process for a renewal operation of the token 105 may be as follows: 1) The user inserts the token 105, such as inserting the smart card into a card reader associated with the client 102. The ESC 110 recognizes the token 105 by its card unique identifier (CUID). 2) The user selects the token 105 and clicks Renew/Re-enroll. 3) The ESC 110 prompts for LDAP authentication (although other authentication mechanisms may be used). For example, the user that owns the token can be authenticated by a user database, for example, by matching the user password against an LDAP entry or other database entry. The user database may be implemented in the same data storage device as the token database 150, or alternatively, in separate data storage devices. When the token is selected in the ESC 110, the ESC 110 sends the TPS 126 the applet version, CUID, Answer-to-Reset (ATR) manufacturing identifiers, and/or other information about the token. The token can be authenticated, for example, by the TKS 124. The token authentication takes place in the form of setting up a secure channel with which the token and the TPS 126 can communicate securely. It should be noted that the token and the user of the token can be authenticated, and the authentications can occur in any order. In this embodiment, because the token record stores a mapping between the token and the user, the token lookup can occur first before the user authentication, since the token record can be used to determine the mapping between the token and the user. 4) The token renewal module 127 of the TPS 126 checks the token policy to determine whether the token 105 can be renewed, and if so, renews the certificate(s) stored on the token 105 as described in more detail below with respect to FIGS. 2, 3A, and 3B. In one embodiment, the renewal module 127 sends a certificate renewal request to the certificate manager 125 to re-issue the original certificate as a renewed certificate. As described above, since the TPS 126 is a trusted subsystem of the certificate manager 125, the requests received from the TPS 126 do not need to be authenticated by the certificate manager 125. The certificate manager 125 receives the certificate renewal requests from the TPS 126, approves the certificate renewal requests, issues the renewed certificates, and sends the renewed certificates back to the TPS 126, which sends the renewed certificates back to the ESC 110 and updates the token database 150. In one embodiment, the certificate manager 125 generates a new certificate as the renewed certificate, but the new certificate has the same keys as the original certificate, but includes a new expiration date. Since the renewed certificate has the same keys as the original certificate, the renewed certificate is functionally identical to the original certificate. In comparison, when re-enrolling a token, the certificate manager 125 generates a new certificate, but the new certificate has new keys, and thus, is not functionally identical to the original certificate. It should be noted that new certificates can be used and the expiration date extended, but the new certificates have to be signed (re-issued).

Figure 2:
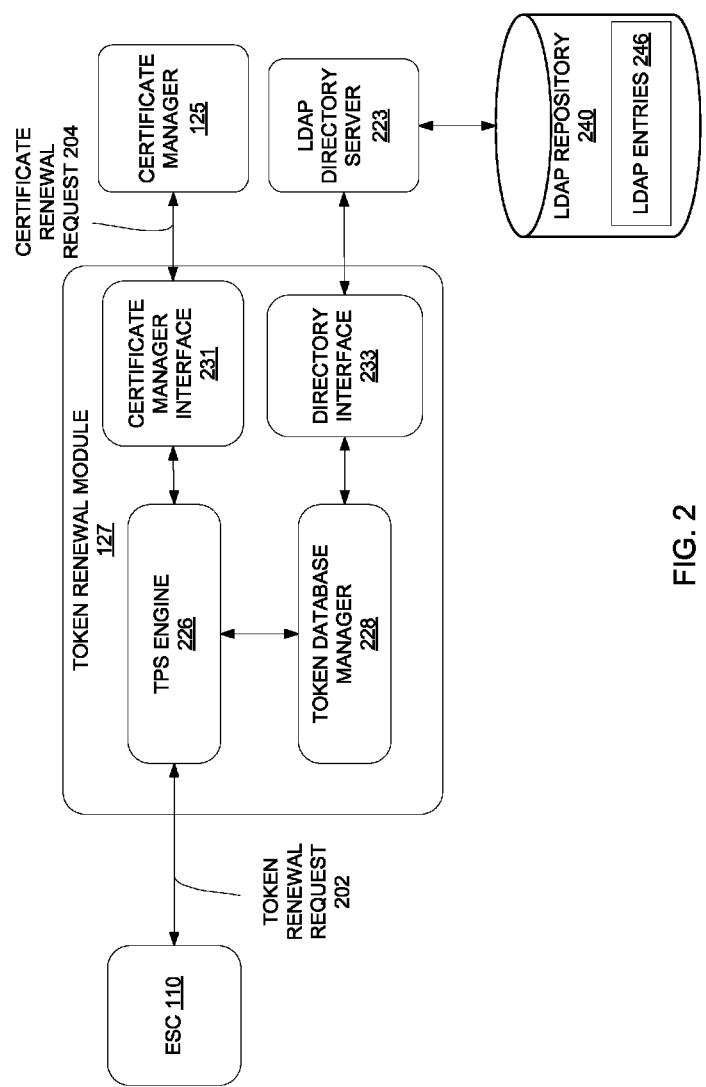
FIG. 2 is a block diagram of one embodiment of the token renewal module of FIG. 1 for renewing certificates of a token.

FIG. 2 is a block diagram of one embodiment of the token renewal module of FIG. 1 for renewing certificates of a token. The token renewal module 127 includes a TPS engine 226, a token database manager 228, a certificate manager interface 231, and a directory interface 233. The TPS engine 226 communicates token operations between the ESC 110 and the certificate manager 125 via the certificate manager interface 231. The TPS engine 226 communicates with the LDAP directory server 223 via the token database manager 228 and the directory interface 233. The TPS engine 226 interacts directly with tokens and manages the keys and certificates on those tokens through the ESC 110, such as to format tokens, enroll, re-enroll, or renew certificates on the tokens, or the like. The ESC 110 contacts the TPS engine 226 when there is a token operation, and the TPS engine 226 interacts with the certificate manager 125, DRM 121 (via an interface not illustrated in FIG. 2), or TKS 124 (via an interface not illustrated in FIG. 2), as required, and then sends the information back to the token 105 via the ESC 110. The TPS engine 226 can also interact with the token database manager 228 to retrieve token information stored in records in the token database, for example, in LDAP entries 246 of the LDAP repository 240. The token database manager 228 accesses the LDAP directory server 223, which manages the LDAP directory, via the directory interface 233. The LDAP directory may store LDAP entries 246 including the token profile that determines whether the token can be re-enrolled or renewed and/or the token data associated with the token 105, as described above.

In one embodiment, an agent can set the token policy in the corresponding record via the token database manager 228. For example, in one embodiment, the agent uses a web browser to access a graphical user interface (GUI) (not illustrated), provided by the token database manager 228, to set the token polices for the tokens whose data is stored in the LDAP entries 246. In one embodiment, the token database manager 228 sets the token profiles based on a characteristic of the token, such as a CUID number. For example, the token database manager 228 may assign tokens to a group based on identification numbers (e.g., a range of CUIDs or ATR batch numbers), and the token database manager 228 can set the token policy to allow renewal of the tokens within the group.

In one embodiment, after the token policy has been set, the TPS engine 226 receives a token renewal request from a client application that manages the token 105. The TPS engine 226 authenticates an owner of the token against a user database (not illustrated) and, upon successful authentication, finds a record of the token in the token database 150 via the token database manager 228. The TPS engine 226 authenticates the token to set up a secure channel and the TPS engine 226 can use the record of the token found during the lookup to determine the mapping between the token and the user in order to authenticate the user of the token. The TPS engine 226 determines whether a token policy in the record allows renewal of certificates stored in the token. When the token policy allows renewal, the TPS engine 226 sends a certificate renewal request to the certificate manager 125 via the certificate manager interface 231 with some or all the information from the record of the token. After the certificate manager 125 has approved the certificate renewal request and issued the renewed certificates, the TPS engine 226 receive the renewed certificate via the certificate manager interface 231 from the certificate manager 125, and sends the renewed certificate to the ESC 110 (i.e., the client application) to store the renewed certificate on the token 105. In another embodiment, the TPS engine 226 updates the token database via the token database manager 228 to indicate that the token has been renewed.

There are two ways the keys can be generated: 1) the keys can be generated on the token, in which case the private key never leaves the token; and 2) the keys can be generated by the DRM 121, in which case the private key is archived by the DRM 121 and then delivered securely back to the token. Unlike token re-enrollment where the new certificate includes a new key pair, token renewal reuses the same key as the original certificate. Because the renewed certificate reuses the same key as the original certificate, token renewal can be faster than re-enrolling the token because a new key pair does not need to be generated for the renewed certificate. Also, since the renewed certificate uses the same key, the tokens do not need to be reformatted with new certificates, and no new keys are generated for renewal.

In another embodiment, the TPS engine 226 is configured to screen out certificates that are not ready for renewal before sending the certificate renewal requests to the certificate manager 125. In one embodiment, the TPS engine 226 determines if the certificate is eligible for renewal, by determining whether the certificate has expired and whether the certificate expiration date is not outside the grace period. If the certificate is not eligible for renewal, the TPS engine 226 does not send a certificate renewal request to the certificate manager 125. In one embodiment, the TPS 226 sends a re-enrollment request instead. In another embodiment, the TPS 226 notifies the user of the token that the renewal has been denied because the certificate has expired and the grace period has expired. However, if the certificate is eligible for renewal, meaning the token policy allows renewal of the token and the certificate expiration date is not outside the grace period, the TPS engine 226 sends a certificate renewal request to the certificate manager 125 to renew the certificate with the same key.

It should be noted that in some embodiments, the token 105 may store more than one certificate, for example, a signing certificate and an encryption certificate. In one embodiment, the TPS engine 226 can determine the number of certificates stored on the token 105 using the corresponding record in the token database. For each certificate in the record, the TPS 226 sends a certificate renewal request to the certificate manager 125 to obtain a renewed certificate. In another embodiment, the TPS engine 226 can determine the number of certificates stored on the token 105 by requesting this information from the ESC 110. For example, the TPS engine 226 can individually request the certificates, and, for each certificate stored on the token 105, send a certificate renewal request to the certificate manager 125. In these embodiments, the TPS engine 226 can check a token policy that applies to all certificates stored on the token 105, or a token policy that applies to each certificate stored on the token 105. Similarly, the TPS engine 226 can check whether each certificate is expired and whether the certificate expiration date is not outside the grace period in determining whether to send the certificate renewal request to the certificate manager 125.

Figure 3A:
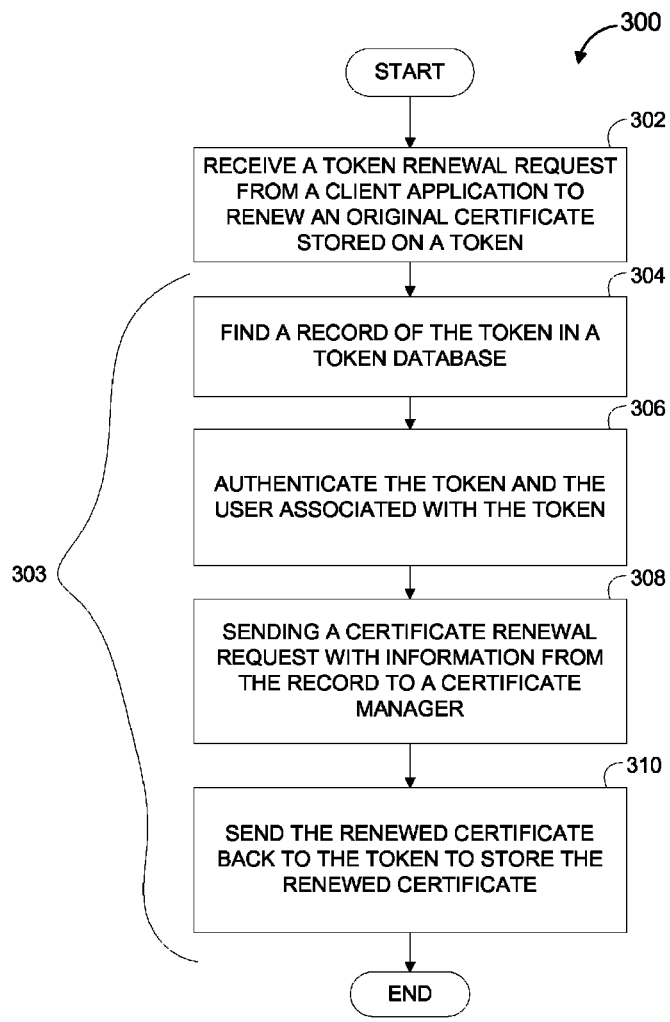
FIG. 3A is a flow diagram of one embodiment of a method of renewing certificates of a token.

FIG. 3A is a flow diagram of one embodiment of a method 300 of renewing certificates of a token. The method 300 is performed by processing logic that may comprise hardware (circuitry, dedicated logic, etc.), software (such as is run on a general purpose computer system or a dedicated machine), firmware (embedded software), or any combination thereof. In one embodiment, the method 300 is performed by the token renewal module 127 of FIGS. 1 and 2.

Referring to FIG. 3A, processing logic begins with receiving a token renewal request from a client application to renew an original certificate stored on a token (block 302). Processing logic renews the original certificate as a renewed certificate when the token renewal request is approved (blocks 303). The renewed certificate has the same key as the original certificate, but includes a new expiration date. The renewed certificate is functionally identical to the original certificate as described above.

In the depicted embodiment of FIG. 3A, the processing logic renews the original certificate by finding a record of the token in the token database (block 304). Next, the processing logic authenticating the token and the user associated with the token (block 306). In one embodiment, the processing logic sets up a secure channel with which the token and the TPS 126 can communicate securely during token authentication at block 306. In one embodiment, the processing logic authenticates the user associated with the token at block 306 by receiving user identification information, including at least a password, and the processing logic authenticates the user against a user database using the user identification information. In another embodiment, the processing logic receives a LDAP user identifier and a password to authenticate an owner of the token against an LDAP directory. Alternatively, other authentication methods may be used to authenticate the user associated with token against the TPS.

Upon finding the record, the processing logic sends a certificate renewal request with information from the record to the certificate manager to approve the certificate renewal request and to issue the renewed certificate (block 308). In one embodiment, the original certificate was previously issued by the certificate manager, and the information sent to the certificate manager includes a serial number identifying the original certificate issued by the certificate manager. Alternatively, other information may be sent to the certificate manager to identify the certificate to be renewed, such as, for example, the public key. When the processing logic receives the renewed certificate from the certificate manager, the processing logic sends the renewed certificate back to the token to store the renewed certificate (block 310), and the method ends. Alternatively, the processing logic may renew the original certificate by using additional operations, such as depicted in FIG. 3B.

Figure 3B:
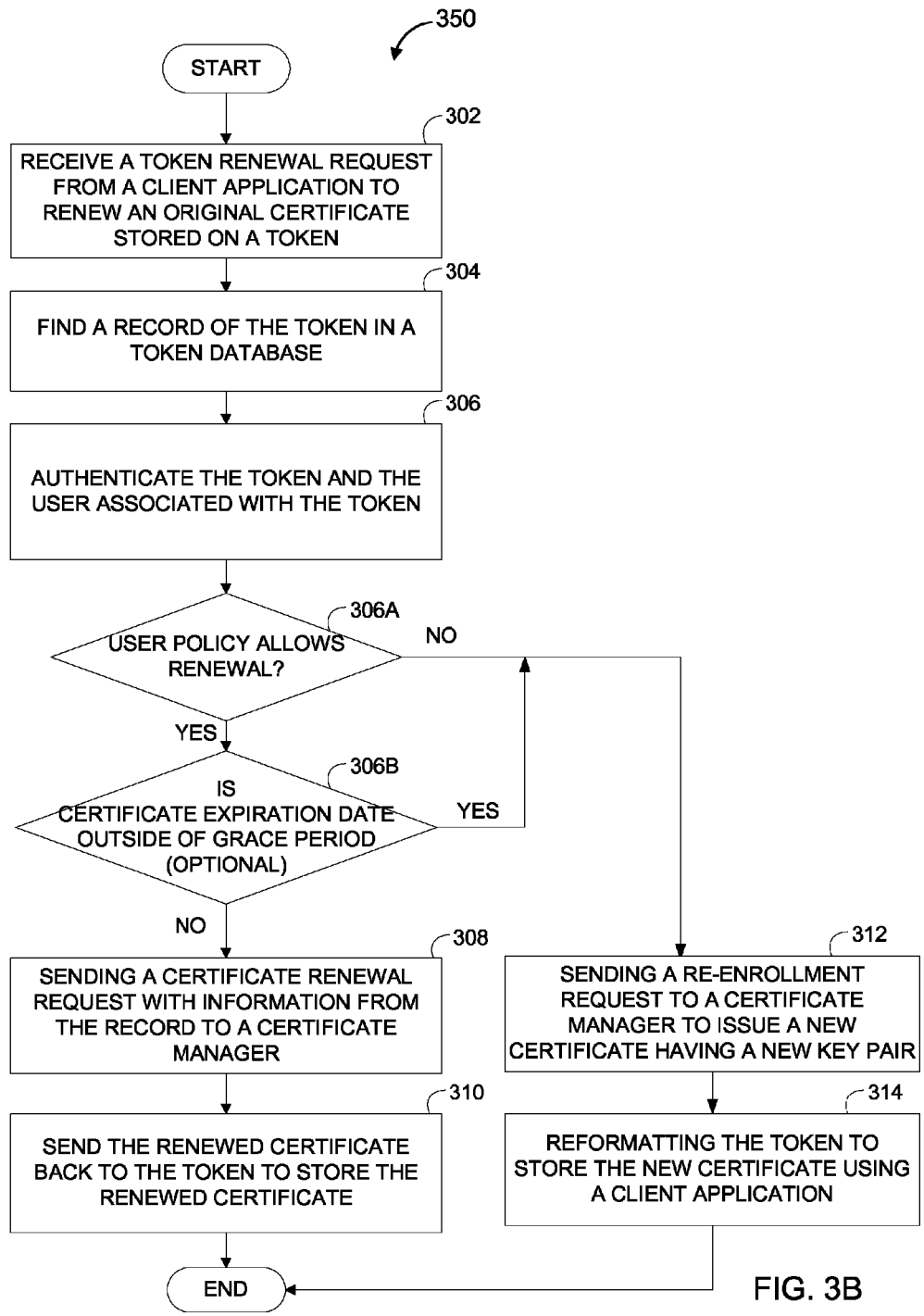
FIG. 3B is a flow diagram of another embodiment of a method of renewing certificates of a token.

FIG. 3B is a flow diagram of another embodiment of a method of renewing certificates of a token. The method 350 is performed by processing logic that may comprise hardware (circuitry, dedicated logic, etc.), software (such as is run on a general purpose computer system or a dedicated machine), firmware (embedded software), or any combination thereof. In one embodiment, the method 350 is performed by the token renewal module 127 of FIGS. 1 and 2.

Referring to FIG. 3B, the method 350 is similar to method 300 as noted by similar reference labels, however, the processing logic determines whether a token policy in the record allows renewal of the token (block 306A). If the token policy does not allow renewal of the token (e.g., RENEW=NO), the processing logic sends a re-enrollment request to the certificate manager to issue a new certificate having a new key pair (block 312) and reformats the token to store the new certificate on the token using the client application (block 314), and the method ends. In one embodiment, the processing logic at block 314 also sends instructions to the client application to erase the original certificate from the token and to store the new certificate on the token. In another embodiment, the processing logic at block 314 sends instructions to the client application to store both the original and new certificates. This may be done when the original and new certificates are encryption certificates.

In one embodiment, if the token policy does allow renewal of the token (e.g., RENEW=YES) at block 306A, the processing logic sends a certificate renewal request with information from the record to the certificate manager to approve the certificate renewal request and to issue the renewed certificate (block 308) and sends the renewed certificate back to the token to store the renewed certificate (block 310), and the method ends.

In another embodiment, if the token policy does allow renewal of the token (e.g., RENEW=YES) at block 306A, the processing logic determines whether the certificate expiration date is not outside the grace period to renew the original certificate in order to determine if the token is eligible for renewal (block 306B). This operation may be optional. In this embodiment, the token is eligible for renewal when the token policy allows renewal of the token at block 306A and the certificate expiration date is not outside the grace period at block 306B. When the token is eligible for renewal, the processing logic sends a certificate renewal request with information from the record to the certificate manager to approve the certificate renewal request and to issue the renewed certificate (block 308) and sends the renewed certificate back to the token to store the renewed certificate (block 310), and the method ends.

In another embodiment, the token stores multiple certificates, for example, a signing certificate and an encryption certificate. In this embodiment, the processing logic renews each of the multiple certificates. In one embodiment of renewing multiple certificates, the processing logic finds a record in the token database and authenticates the token and a user associated with the token as described above. The processing logic sends a certificate renewal request for each of the certificates found in the record to the certificate manager, and sends each of the renewed certificates back to the token to store each of the renewed certificates. In another embodiment of renewing multiple certificates, the processing logic determines the number of certificates stored on the token by requesting information for each of the certificates stored on the token from the client application information. The processing logic sends a certificate renewal request for each certificate with information received from the client application to the certificate manager, and sends each of the renewed certificates back to the token to store each of the renewed certificates.

In another embodiment of renewing multiple certificates, the processing logic determines, for each of the certificates stored on the token, whether a token policy in the record allows renewal of the respective certificate. In one embodiment, the token policy allows renewal of a first type of certificates (e.g., encryption certificates), but requires re-enrollment of a second type of certificate (e.g., signing certificates), or vice versa. For each certificate of the first type, the processing logic sends a certificate renewal request to the certificate manager. For each certificate of the second type, the processing logic sends a re-enrollment request to the certificate manager 125 to generate a new certificate having a new key pair for the respective certificate. The processing logic sends each renewed certificate and each new certificate back to the token to be stored.

Figure 4:
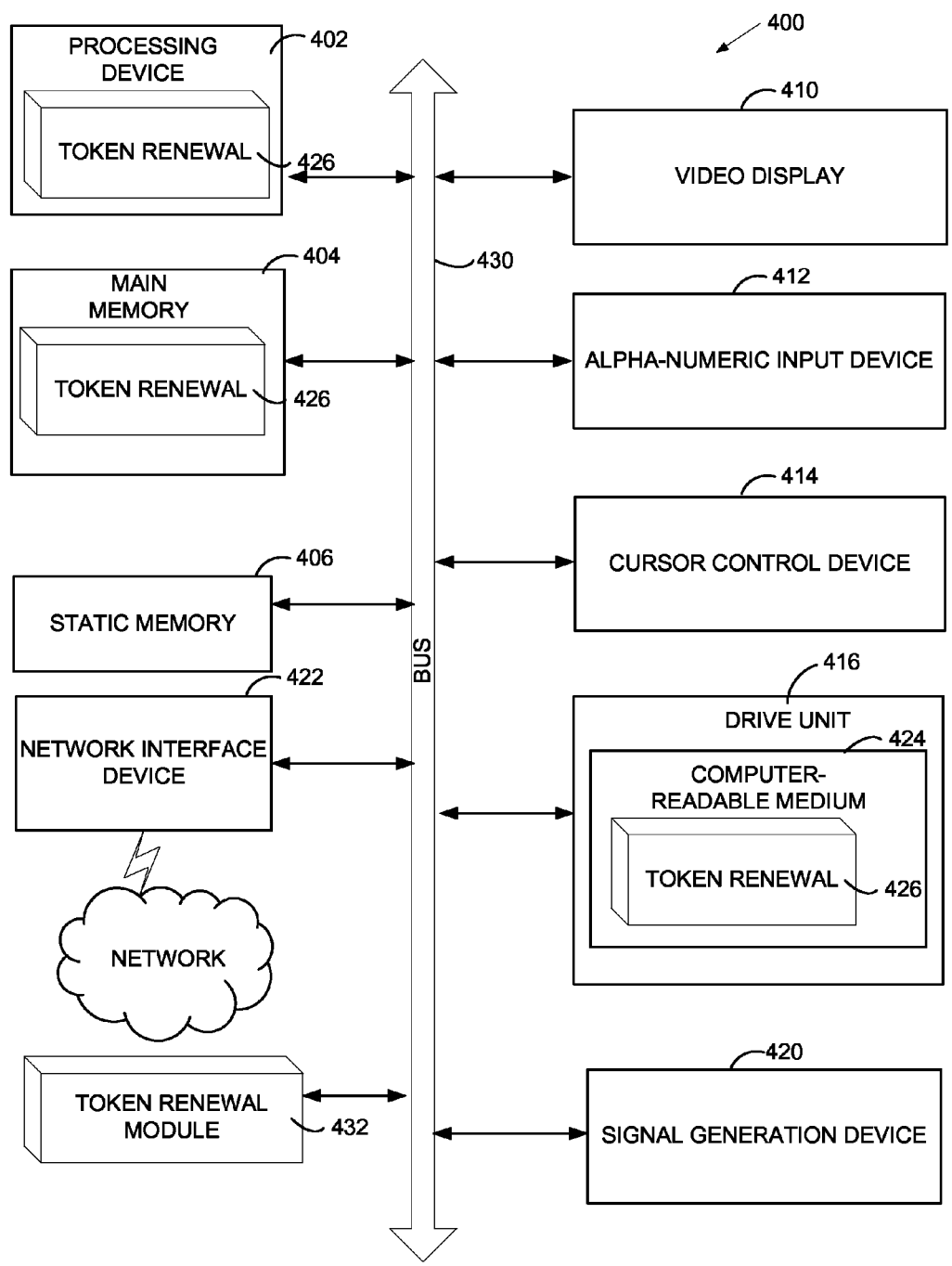
FIG. 4 illustrates a diagrammatic representation of a machine in the exemplary form of a computer system for token renewal.

FIG. 4 illustrates a diagrammatic representation of a machine in the exemplary form of a computer system 400 for token renewal. Within the computer system 400 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of token renewal, such as the methods 300 and 350 described above. In one embodiment, the computer system 400 represents various components that may be implemented in the TPS 126 as described above. Alternatively, the TPS 126 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., token renewal 426) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., token renewal 426) embodying any one or more of the methodologies or functions described herein. The token renewal 426 may also reside, completely or at least partially, within the main memory 404 and/or within the processing device 402 during execution thereof by the computer system 400, the main memory 404 and the processing device 402 also constituting computer-readable storage media. The token renewal 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The token renewal module 432, components, and other features described herein (for example in relation to FIGS. 1-2) can be implemented as discrete hardware components or integrated in the functionality of hardware components such as ASICS, FPGAs, DSPs or similar devices. In addition, the token renewal 432 can be implemented as firmware or functional circuitry within hardware devices. Further, the token renewal 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method, implemented by a computing system programmed to perform operations, comprising:
   receiving, by the computing system, a token renewal request for renewing an original digital certificate stored on a token, wherein the original digital certificate comprises an original key and an original expiration date; and renewing, by the computing system, the original digital certificate as a renewed certificate when the token renewal request is approved, wherein the renewed certificate comprises the original key and a new expiration date, wherein the renewed certificate is functionally identical to the original digital certificate, and wherein renewing the original digital certificate comprises:
authenticating the token and a user associated with the token,
determining whether a token policy allows renewal of the token,
when the token policy allows token renewal, sending a certificate renewal request to obtain the renewed certificate, and
when the token policy does not allow token renewal, sending a re-enrollment request to a certificate manager to issue a new certificate comprising a new key pair.

2. The method of claim 1, wherein the renewing comprises:
finding a record of the token in a token database of the computing system;
sending a certificate renewal request with information from the record to a certificate manager to approve the certificate renewal request and to issue the renewed certificate; and
sending the renewed certificate back to the token to store the renewed certificate.

3. The method of claim 1, wherein renewing the original digital certificate further comprises:
finding a record of the token in a token database of the computing system; and
sending the renewed certificate back to the token to store the renewed certificate, wherein sending the certificate renewal request to obtain the renewed certificate comprises:
sending the certificate renewal request with information from the record to a certificate manager to approve the certificate renewal request and to issue the renewed certificate.

4. The method of claim 3, wherein the original digital certificate was previously issued by the certificate manager, and wherein the information comprises a serial number identifying the original digital certificate issued by the certificate manager.

5. The method of claim 3, wherein authenticating the user associated with the token comprises:
receiving user identification information comprising a password; and
authenticating the user against a user database using the user identification information.

6. The method of claim 3, wherein authenticating the user associated with the token comprises:
receiving a Lightweight Directory Access Protocol (LDAP) user identifier and a password to access a LDAP directory; and
authenticating the token against the LDAP directory using the LDAP user identifier and the password.

7. The method of claim 3, wherein authenticating the token sets up a secure channel for the token and a token processing system (TPS) to communicate securely.

8. The method of claim 1, further comprising:
when the token policy does not allow token renewal, sending the new certificate to a client application to store the new certificate on the token.

9. The method of claim 8, further comprising instructing the client application to store the new certificate and the original digital certificate on the token, wherein the original digital certificate and the new certificate are encryption certificates.

10. The method of claim 1, wherein renewing the original digital certificate further comprises:
finding a record of the token in a token database of the computing system;
determining whether the original digital certificate is eligible for renewal, wherein the token is eligible for renewal when the token policy allows renewal of the token and the original expiration date is not outside a grace period to renew the original digital certificate;
when the token is eligible for renewal, sending the certificate renewal request with information from the record to a certificate manager to approve the certificate renewal request and to issue the renewed certificate; and
sending the renewed certificate back to the token to store the renewed certificate.

11. A method, implemented by a computing system programmed to perform operations, comprising:
receiving, by the computing system, a token renewal request for renewing an original digital certificate stored on a token, wherein the original digital certificate comprises an original key and an original expiration date, wherein the token stores a plurality of digital certificates, including the original digital certificate; and
renewing the plurality of digital certificates as a plurality of renewed certificates, wherein renewing the plurality of digital certificates comprises:
finding a record of the token in a token database of the computing system,
authenticating the token and a user associated with the token,
determining whether a token policy in the record allows renewal of the token,
when the token policy allows renewal of the token,
determining a number of the plurality of digital certificates stored on the token from the record,
determining whether the token policy in the record allows renewal of each of the plurality of digital certificates stored on the token,
sending a certificate renewal request for each of the plurality of digital certificates in the record to a certificate manager to approve the respective certificate renewal request and to issue a renewed certificate when the respective certificate renewal request is approved.

12. The method of claim 11, wherein renewing the plurality of digital certificates further comprises:
sending each of the plurality of renewed certificates back to the token to store each of the plurality of renewed certificates.

13. A method, implemented by a computing system programmed to perform operations, comprising:
receiving, by the computing system, a token renewal request for renewing an original digital certificate stored on a token, wherein the original digital certificate comprises an original key and an original expiration date, wherein the token stores a plurality of digital certificates, including the original digital certificate; and
renewing the plurality of digital certificates as a plurality of renewed certificates, wherein renewing the plurality of digital certificates comprises:
finding a record of the token in a token database of the computing system, authenticating the token and a user associated with the token, determining whether a token policy in the record allows renewal of the token, determining a number of the plurality of digital certificates stored on the token by requesting information for each of the plurality of digital certificates from a client application that communicates with the token, sending a certificate renewal request for each of the plurality of digital certificates with the information received from the client application to a certificate manager to approve the respective certificate renewal request and to issue a renewed certificate when the respective certificate renewal request is approved, and sending each of the plurality of renewed certificates back to the token to store each of the plurality of renewed certificates.

14. A method, implemented by a computing system programmed to perform operations, comprising:

receiving, by the computing system, a token renewal request for renewing an original digital certificate stored on a token, wherein the original digital certificate comprises an original key and an original expiration date, wherein the token stores a plurality of digital certificates, including the original digital certificate; and renewing the plurality of digital certificates as a plurality of renewed certificates, wherein renewing the plurality of digital certificates comprises:

finding a record of the token in a token database of the computing system, authenticating the token and a user associated with the token, for each of the plurality of digital certificates, determining whether a token policy in the record allows renewal of the respective certificate, wherein the token policy allows renewal of a first type of certificate, but requires re-enrollment of a second type of certificate, for each of the plurality of digital certificates of the first type, sending a certificate renewal request with information from the respective certificate to a certificate manager to approve the respective certificate renewal request and to issue a renewed certificate when the respective certificate renewal request is approved, for each of the plurality of digital certificates of the second type, sending a re-enrollment request to the certificate manager to generate a new certificate comprising a new key pair for the respective certificate, and sending each of the renewed certificates and each of the new certificates back to the token to be stored.

15. A certificate system, comprising:

a data storage device to store token data associated with a plurality of tokens that store at least one digital certificate; and a first server, comprising a token processing system (TPS), coupled to the data storage device, wherein the TPS is to receive a token renewal request for renewing an original digital certificate stored on a token, and to renew the original digital certificate as a renewed certificate when the token renewal request is approved using the token data, wherein the original digital certificate comprises an original key and an original expiration date, wherein the renewed certificate comprises the original key and a new expiration date, wherein the renewed certificate is functionally identical to the original digital certificate, and wherein to renew the original digital certificate comprises:

authenticating the token and a user associated with the token, determining whether a token policy allows renewal of the token, when the token policy allows token renewal, sending a certificate renewal request to obtain the renewed certificate, and when the token policy does not allow token renewal, sending a re-enrollment request to a certificate manager to issue a new certificate comprising a new key pair.

16. The certificate system of claim 15, further comprising a second server, comprising a certificate manager, coupled to the first server, wherein the TPS is to send a certificate renewal request to the certificate manager to approve the certificate renewal request and to issue the renewed certificate, and to send the renewed certificate back to the token to store the renewed certificate.

17. The certificate system of claim 15, wherein the data storage device is to manage a token database to store a record for the token, to associate the token with the original digital certificate stored on the token and with the user, wherein the TPS is to find the record of the token in the token database in response to receipt of the token renewal request, and wherein the TPS is to send a certificate renewal request with information from the record to the certificate manager to approve the certificate renewal request and to issue the renewed certificate.

18. The certificate system of claim 17, wherein the token database is managed by a Lightweight Directory Access Protocol (LDAP) directory server coupled to the first server, and wherein the record of the token comprises the token policy that specifies whether the original digital certificate stored on the token can be renewed, and a serial number identifying the original certificate issued by the certificate manager.

19. The certificate system of claim 15, wherein the TPS comprises a token renewal module that comprises:

a TPS engine coupled to receive the token renewal request from a client application that manages the token; and a token database manager coupled to the TPS engine and the data storage device, wherein the TPS engine is to find a record of the token via the token database manager, and wherein the TPS engine is further to send the certificate renewal request with information from the record to a second server, the second server comprising the certificate manager to approve the certificate renewal request and to issue the renewed certificate, and to send the renewed certificate back to the token to store the renewed certificate.

20. A non-transitory machine-readable storage medium having instructions, which when executed, cause a token processing system (TPS) of a computing system to perform operations comprising:

receiving a token renewal request for renewing an original digital certificate stored on a token, wherein the original digital certificate comprises an original key and an original expiration date; and renewing, by the TPS, the original digital certificate as a renewed certificate when the token renewal request is approved, wherein the renewed certificate comprises the original key and a new expiration date, wherein the renewed certificate is functionally identical to the original digital certificate, wherein renewing the original digital certificate comprises:

authenticating the token and a user associated with the token, determining whether a token policy allows renewal of the token, when the token policy allows token renewal, sending a certificate renewal request to obtain the renewed certificate, and when the token policy does not allow token renewal, sending a re-enrollment request to a certificate manager to issue a new certificate comprising a new key pair.

21. The non-transitory machine-readable storage medium of claim 20, wherein the renewing comprises:

finding a record of the token in a token database of the computing system;

sending the renewed certificate back to the token to store the renewed certificate, wherein sending the certificate renewal request to obtain the renewed certificate comprises:

sending the certificate renewal request with information from the record to the certificate manager to approve the certificate renewal request and to issue the renewed certificate.

22. The non-transitory machine-readable storage medium of claim 20, wherein the renewing comprises:

finding a record of the token in the token database;

determining whether the token policy in the record allows renewal of the token;

determining whether the original digital certificate is eligible for renewal, wherein the token is eligible for renewal when the token policy allows renewal of the token and the original expiration date is not outside a grace period to renew the original digital certificate;

when the token is eligible for renewal, sending the certificate renewal request with information from the record to the certificate manager to approve the certificate renewal request and to issue the renewed certificate; and sending the renewed certificate back to the token to store the renewed certificate.

* * * * *